(12) United States Patent
Lacko

(10) Patent No.: US 12,116,121 B2
(45) Date of Patent: Oct. 15, 2024

(54) AIRFOIL SYSTEM WITH EMBEDDED ELECTRIC DEVICE

(71) Applicant: Rohr, Inc., Chula Vista, CA (US)

(72) Inventor: Anthony Lacko, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 60 days.

(21) Appl. No.: 17/240,129

(22) Filed: Apr. 26, 2021

(65) Prior Publication Data

US 2022/0340253 A1  Oct. 27, 2022

(51) Int. Cl.
*B64C 3/20* (2006.01)
*B64C 3/26* (2006.01)

(52) U.S. Cl.
CPC . *B64C 3/20* (2013.01); *B64C 3/26* (2013.01)

(58) Field of Classification Search
CPC .... B64C 3/20; B64C 3/24; B64C 3/26; B64C 5/06
See application file for complete search history.

(56) References Cited

U.S. PATENT DOCUMENTS

| | | | |
|---|---|---|---|
| 4,072,952 A * | 2/1978 | Demko | H01Q 1/283 343/729 |
| 4,509,053 A | 4/1985 | Robin | |
| 6,097,343 A | 8/2000 | Goetz | |
| 7,205,066 B1 | 4/2007 | Hammi | |
| 7,238,409 B1 * | 7/2007 | Peterson | B29C 66/721 428/167 |
| 9,019,161 B1 | 4/2015 | Billsberry | |
| 9,270,016 B2 | 2/2016 | Stoneback | |
| 9,457,886 B2 | 10/2016 | Hazen | |
| 9,527,238 B2 | 12/2016 | Kruckenberg | |
| 10,848,189 B2 | 11/2020 | Bolton | |
| 2008/0042011 A1 | 2/2008 | Childs | |
| 2011/0211965 A1 | 9/2011 | Deal | |
| 2013/0016019 A1 | 1/2013 | Stoneback | |
| 2013/0101432 A1 * | 4/2013 | Harris, Jr. et al. | F01D 5/286 416/241 R |
| 2014/0159965 A1 | 6/2014 | Le | |
| 2015/0132137 A1 | 5/2015 | Humblot | |
| 2016/0343467 A1 * | 11/2016 | Wen | H01B 7/0823 |

(Continued)

FOREIGN PATENT DOCUMENTS

| | | | |
|---|---|---|---|
| EP | 0037987 B1 | 10/1987 | |
| EP | 3560818 A1 * | 10/2019 | B64C 3/185 |

(Continued)

OTHER PUBLICATIONS

EP search report for EP22170111.5 dated Sep. 16, 2022.
EP search report for EP22170106.3 dated Sep. 5, 2022.

*Primary Examiner* — Philip J Bonzell
*Assistant Examiner* — Eric Acosta
(74) *Attorney, Agent, or Firm* — Getz Balich LLC

(57) ABSTRACT

An airfoil system is provided that includes an airfoil and an electric device. The airfoil includes a first exterior surface, a second exterior surface, a first airfoil segment and a second airfoil segment attached to the first airfoil segment. The airfoil extends widthwise between the first exterior surface and the second exterior surface. The first airfoil segment forms the first exterior surface. The second airfoil segment forms the second exterior surface. The electric device is embedded within the airfoil between the first airfoil segment and the second airfoil segment.

17 Claims, 13 Drawing Sheets

(56) References Cited

U.S. PATENT DOCUMENTS

| | | |
|---|---|---|
| 2017/0297279 A1 | 10/2017 | Fiegl |
| 2019/0176957 A1 | 6/2019 | Braley |
| 2020/0386240 A1 | 12/2020 | Watson |
| 2021/0032997 A1 | 2/2021 | Bales |
| 2022/0115777 A1 | 4/2022 | Konitzer |

FOREIGN PATENT DOCUMENTS

| | | |
|---|---|---|
| FR | 3024293 B1 | 12/2017 |
| RO | 132984 A1 | 12/2018 |
| WO | 2015051803 A1 | 4/2015 |

* cited by examiner

AIRFOIL SYSTEM WITH EMBEDDED ELECTRIC DEVICE

BACKGROUND

1. Technical Field

This disclosure relates generally to an aircraft and, more particularly, to systems and devices for arranging one or more electric devices on an exterior of the aircraft.

2. Background Information

A modern aircraft such as an airplane includes a communication system. This communication system may include an antenna for relaying signals between the airplane and another remote entity; e.g., another airplane, ground control, satellites, etc. This antenna may be mounted on an exterior of the airplane or within an interior of the airplane; e.g., beneath a skin of an airplane fuselage or an airplane wing. While mounting the antenna on the exterior of the airplane may provide a substantially unobstructed signal path between the exposed antenna and the remote entity, exposure of the antenna increases airplane drag. While mounting the antenna within the interior of the airplane reduces airplane drag, a structure (e.g., skin, frame, etc.) surrounding the antenna may interfere with the signal path between the enclosed antenna and the remote entity.

As a compromise between mounting the antenna within the interior of the airplane and having the antenna exposed on the exterior of the airplane, it is known in the art to dispose the antenna within an aerodynamic fin; e.g., an aerodynamic antenna housing. This fin is mounted on the exterior of the airplane and, thus, positions the antenna outside of the airplane skin and the internal frame. However, such a fin may still interfere with signal transmission between the antenna and the remote entity, particularly where the fin is made from metallic materials and/or uses traditional metal fasteners; e.g., bolts, screws, rivets, etc. Known fins may also be difficult and costly to manufacture.

There is a need in the art for improved techniques and/or assemblies for housing an electric device such as an antenna on an exterior of an aircraft.

SUMMARY OF THE DISCLOSURE

According to an aspect of the present disclosure, an airfoil system is provided that includes an airfoil and an electric device. The airfoil includes a first exterior surface, a second exterior surface, a first airfoil segment and a second airfoil segment attached to the first airfoil segment. The airfoil extends widthwise between the first exterior surface and the second exterior surface. The first airfoil segment forms the first exterior surface. The second airfoil segment forms the second exterior surface. The electric device is embedded within the airfoil between the first airfoil segment and the second airfoil segment.

According to another aspect of the present disclosure, another airfoil system is provided that includes an airfoil body and an electric device. The airfoil body includes a first airfoil segment and a second airfoil segment attached to the first airfoil segment. The first airfoil segment is configured from or otherwise includes first composite material. The first airfoil segment forms a first half of the airfoil body. The second airfoil segment is configured from or otherwise includes second composite material. The second airfoil segment forms a second half of the airfoil body. The electric device is located within an internal cavity of the airfoil body between the first airfoil segment and the second airfoil segment.

According to still another aspect of the present disclosure, a manufacturing method is provided. During this method, a first airfoil segment is formed as a first monolithic body. A second airfoil segment is formed as a second monolithic body. An electric device is attached to the first airfoil segment. The second airfoil segment is attached to the first airfoil segment to provide an airfoil body. The electric device is embedded within the airfoil body between the first airfoil segment and the second airfoil segment.

The first airfoil segment and the second airfoil segment may each be configured from or otherwise include non-metallic material.

The method may also include attaching a shield to the airfoil body to form a leading edge of an airfoil. The airfoil may include the airfoil body and the shield.

The first composite material and/or the second composite material may each be or otherwise include fiberglass reinforcement within a resin matrix.

The airfoil system may also include an airfoil which includes a first exterior surface, a second exterior surface and the airfoil body. The airfoil may extend widthwise between the first exterior surface and the second exterior surface. The first airfoil segment may form the first exterior surface. The second airfoil segment may form the second exterior surface.

The electric device may be configured as or otherwise include an antenna.

The electric device may be configured as or otherwise include a sensor.

The airfoil may also include an internal cavity formed collectively by the first airfoil segment and the second airfoil segment. The electric device may be located at least partially or completely within the internal cavity.

The internal cavity may extend widthwise within the airfoil between a first cavity side and a second cavity side. The first airfoil segment may form the first cavity side. The second airfoil segment may form the second cavity side.

The internal cavity may extend lengthwise within the airfoil between a cavity leading end and a cavity trailing end. The first airfoil segment may form a first portion of the cavity leading end and a first portion of the cavity trailing end. The second airfoil segment may form a second portion of the cavity leading end and a second portion of the cavity trailing end.

The internal cavity may extend spanwise within the airfoil between a cavity base end and a cavity tip end. The first airfoil segment may form a first portion of the cavity base end and a first portion of the cavity tip end. The second airfoil segment may form a second portion of the cavity base end and a second portion of the cavity tip end.

The electric device may be attached to the first airfoil segment and/or the second airfoil segment.

The first airfoil segment may be configured as or otherwise include a first exterior skin that forms the first exterior surface. The second airfoil segment may be configured as or otherwise include a second exterior skin that forms the second exterior surface. The first exterior skin and/or the second exterior skin each be configured from or otherwise include composite material.

The first airfoil segment may include a first exterior skin and a first internal support formed integral with the first exterior skin. The first exterior skin may form the first exterior surface. The second airfoil segment may include a second exterior skin and a second internal support formed integral with the second exterior skin. The second exterior skin may form the second exterior surface. The first internal support may engage and may be attached to the second internal support.

The first internal support may be abutted against and bonded to the second internal support.

The first internal support may include a receptacle. The second internal support may include a key that is mated with the receptacle.

The airfoil may be configured as or otherwise include an airfoil body. The first airfoil segment may be a first half of the airfoil body. The second airfoil segment may be a second half of the airfoil body.

The airfoil may also include a shield. The shield may be configured at and extend spanwise along a leading edge of the airfoil. The shield may overlap and may be attached to a first leading edge portion of the first airfoil segment and a second leading edge portion of the second airfoil segment.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
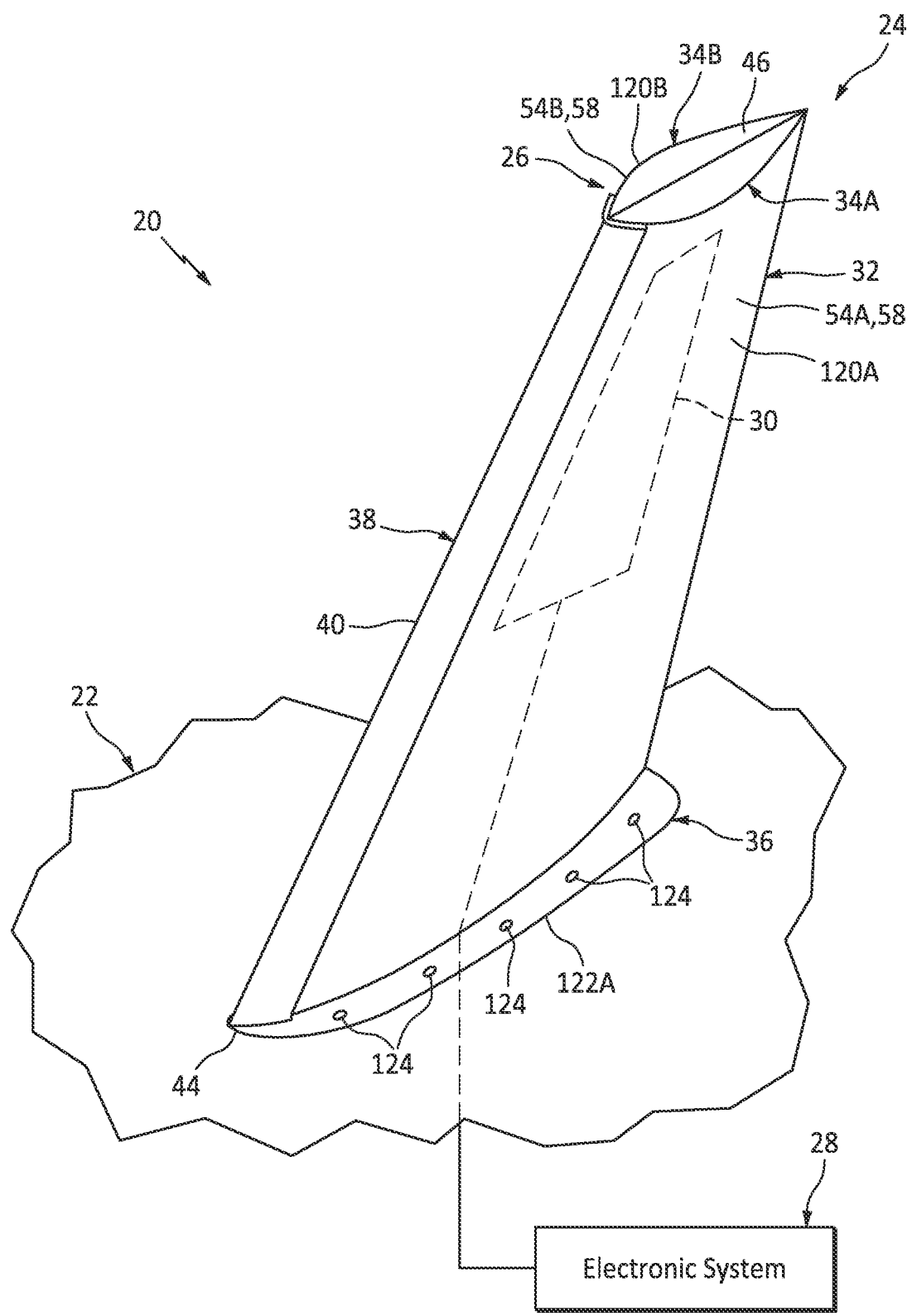
FIG. 1 is a perspective illustration of an assembly for an aircraft with an electronic system schematically depicted.

FIG. 1 illustrates a portion of an assembly 20 for an aircraft. Herein, the term "aircraft" may generally describe any mobile device which travels through at least air and/or space. The aircraft, for example, may be configured as an airplane, a helicopter, a spacecraft, a drone (e.g., an unmanned aerial vehicle (UAV)) or a projectile such as, but not limited to, a rocket. The present disclosure, however, is not limited to the foregoing exemplary aircraft configurations.

The aircraft assembly 20 of FIG. 1 includes a base 22 and an airfoil system 24. The aircraft assembly base 22 may be any portion of the aircraft to which the airfoil system 24 may be mounted. The aircraft assembly base 22, for example, may be configured as an exterior skin or other exterior structure of: an aircraft fuselage, an aircraft tail assembly, an aircraft wing, an engine pylon or a nacelle housing an aircraft engine. The present disclosure, however, is not limited to the foregoing exemplary aircraft assembly base configurations.

The airfoil system 24 of FIG. 1 is configured to at least partially or completely form an aerodynamic projection (e.g., a control element, a control surface, etc.) on the aircraft assembly base 22. The airfoil system 24 of FIG. 1, for example, includes a hollow airfoil 26. This airfoil 26 may be configured as a wing, a vane, a fin and/or a vortex generator (e.g., a strake). Examples of the wing may include, but are not limited to, a winglet, a stub wing, a main wing, a tail wing and a stabilizer.

The airfoil system 24 of FIG. 1 is also configured as part of an electronic system 28 of the aircraft such as, but not limited to, a communication system and/or a sensor system. The airfoil system 24 of FIG. 1, for example, includes at least one electric device 30 configured with (e.g., housed within) the airfoil 26. This electric device 30 may be configured as or otherwise include an antenna such as, but not limited to, a VHF antenna. The electric device 30 may also or alternatively be configured as or otherwise include a sensor such as, but not limited to, a prognostics and health management (PHM) sensor. The present disclosure, however, is not limited to the foregoing exemplary electric device configurations nor to communication or sensor system electric components.

Various types of electric devices may suffer from signal interference (e.g., signal loss and/or signal path obstruction) when housed within or otherwise surrounded by metal and/or conductive materials. To reduce or eliminate potential for such signal interference for the electric device 30 of FIG. 1, the airfoil 26 is constructed substantially (or only) from non-metallic and/or dielectric material(s). More particularly, at least a significant portion of a hollow body 32 of the airfoil 26 that forms a housing and/or a shell about the electric device 30 may be constructed substantially (or only) from the non-metallic and/or dielectric material(s). In addition, to facilitate placement of the electric device 30 within the airfoil system 24 during assembly, the airfoil 26 may be configured with a segmented (e.g., clamshell-like) construction. However, to further reduce or eliminate potential for signal interference, the airfoil 26 may be configured without, for example, any traditional fasteners (e.g., bolts, screws, rivets, etc.) for securing its airfoil segments 34A and 34B (generally referred to as "34") together. Additional details regarding the construction of the airfoil 26 are described below in further detail.

The airfoil system 24 of FIG. 1 includes the airfoil 26 and an airfoil mount 36 configured to attach/secure the airfoil system 24 and its airfoil 26 to the aircraft assembly base 22. The airfoil system 24 of FIG. 1 also includes the electric device 30 configured (e.g., embedded, encapsulated and/or otherwise disposed) within the airfoil 26. However, in other embodiments, the airfoil system 24 may be configured without the electric device 30 in order to provide the aerodynamic projection described herein without also being part of the aircraft electronic system 28. The airfoil 26, for example, may be configured to form a hollow aircraft control element without housing any electric devices therewithin.

The airfoil 26 of FIG. 1 is configured with/includes its hollow airfoil body 32. The airfoil 26 of FIG. 1 also includes a leading edge (LE) shield 38 configured to protect the airfoil body 32 at a leading edge 40 of the airfoil 26.

Figure 2:
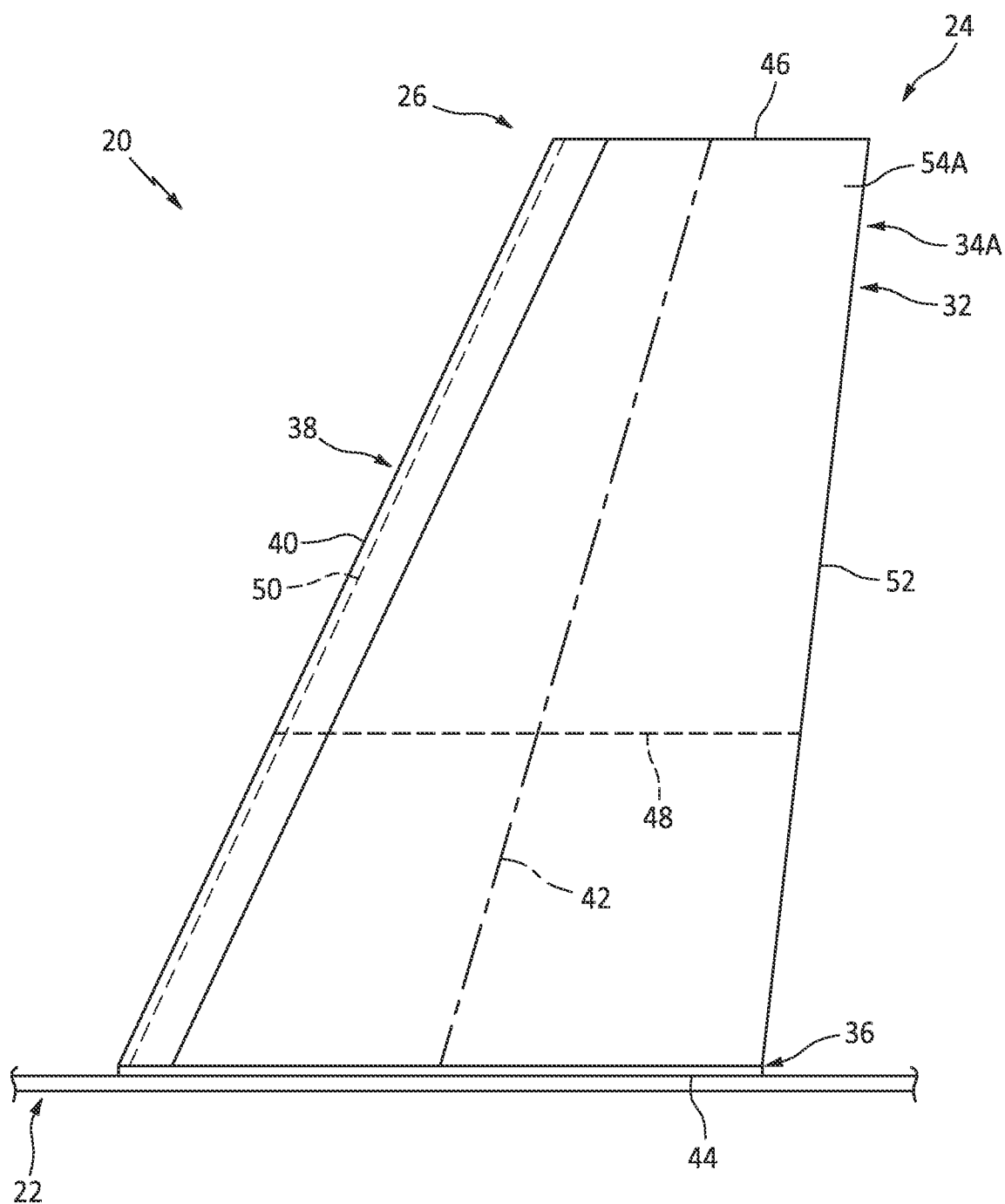
FIG. 2 is a side illustration of an airfoil system mounted to an aircraft assembly base.
Figure 3:
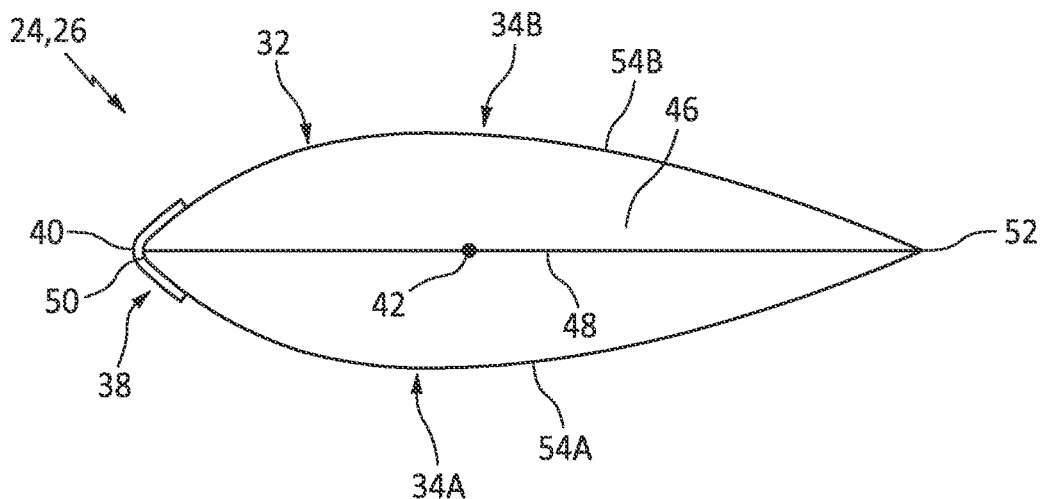
FIG. 3 is an illustration of a tip of the airfoil system with a symmetric configuration.
Figure 4A:
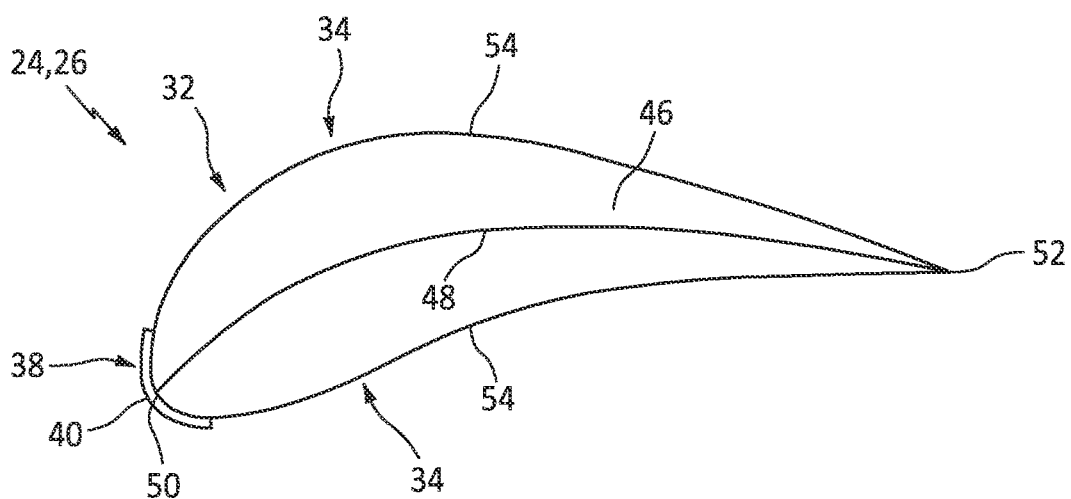
FIGS. 4A and 4B are illustrations of the airfoil system tip with various asymmetric configurations.
Figure 4B:
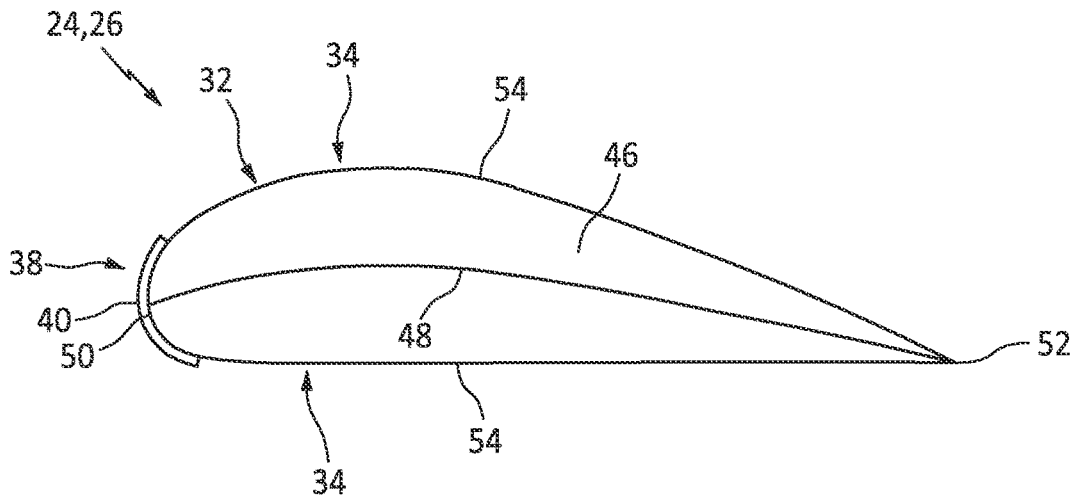

Referring to FIG. 2, the airfoil body 32 extends spanwise along a centerline 42 (e.g., a span line) of the airfoil 26 from a base 44 (e.g., a root) of the airfoil 26 to a tip 46 of the airfoil 26. Referring to FIG. 3, the airfoil body 32 extends lengthwise along a camber line 48 of the airfoil 26 from a leading edge 50 of the airfoil body 32 to a trailing edge 52 of the airfoil 26, where the airfoil body leading edge 50 is arranged at (e.g., on, adjacent or proximate) the airfoil leading edge 40. In the specific embodiment of FIG. 3, the airfoil body leading edge 50 is slightly recessed inward from the airfoil leading edge 40 by a thickness of the shield 38. However, in other embodiments, the airfoil body leading edge 50 may be on (e.g., the same as) the airfoil leading edge 40 where, for example, the shield 38 is omitted or incorporated as part of the airfoil body 32. Referring again to FIG. 3, the airfoil body 32 extends widthwise (e.g., transverse to the centerline 42 and/or the camber line 48) between and to opposing side exterior surfaces 54A and 54B (generally referred to as "54") of the airfoil body 32; e.g., exteriormost/outer-most surfaces of the airfoil body 32. Each of these airfoil body exterior surfaces 54 may be configured as a convex surface as shown in FIG. 3. Alternatively, either one of the airfoil body exterior surfaces 54A or 54B may be a concave surface (see FIG. 4A) or a substantially flat surface (see FIG. 4B).

Referring to FIGS. 2 and 3, the airfoil body 32 includes the plurality of airfoil segments 34; e.g., a complimentary pair of airfoil segments. These airfoil segments 34 may be configured as respective halves of the airfoil body 32. The airfoil segment 34A, for example, may form one half (or portion) of the airfoil body 32 on one side of the airfoil body 32; e.g., towards the airfoil body exterior surface 54A. The airfoil segment 34B, on the other hand, may form the other remaining half (or portion) of the airfoil body 32 on an opposing side of the airfoil body 32; e.g., towards the airfoil body exterior surface 54B. The airfoil segments 34 of FIG. 3 have substantially identical (but, mirror image) configurations. The present disclosure, however, is not limited to such an exemplary identical, mirror image configuration. For example, referring to FIGS. 4A and 4B, the airfoil segments 34 may alternatively have different (but, still complementary) configurations.

Figure 5:
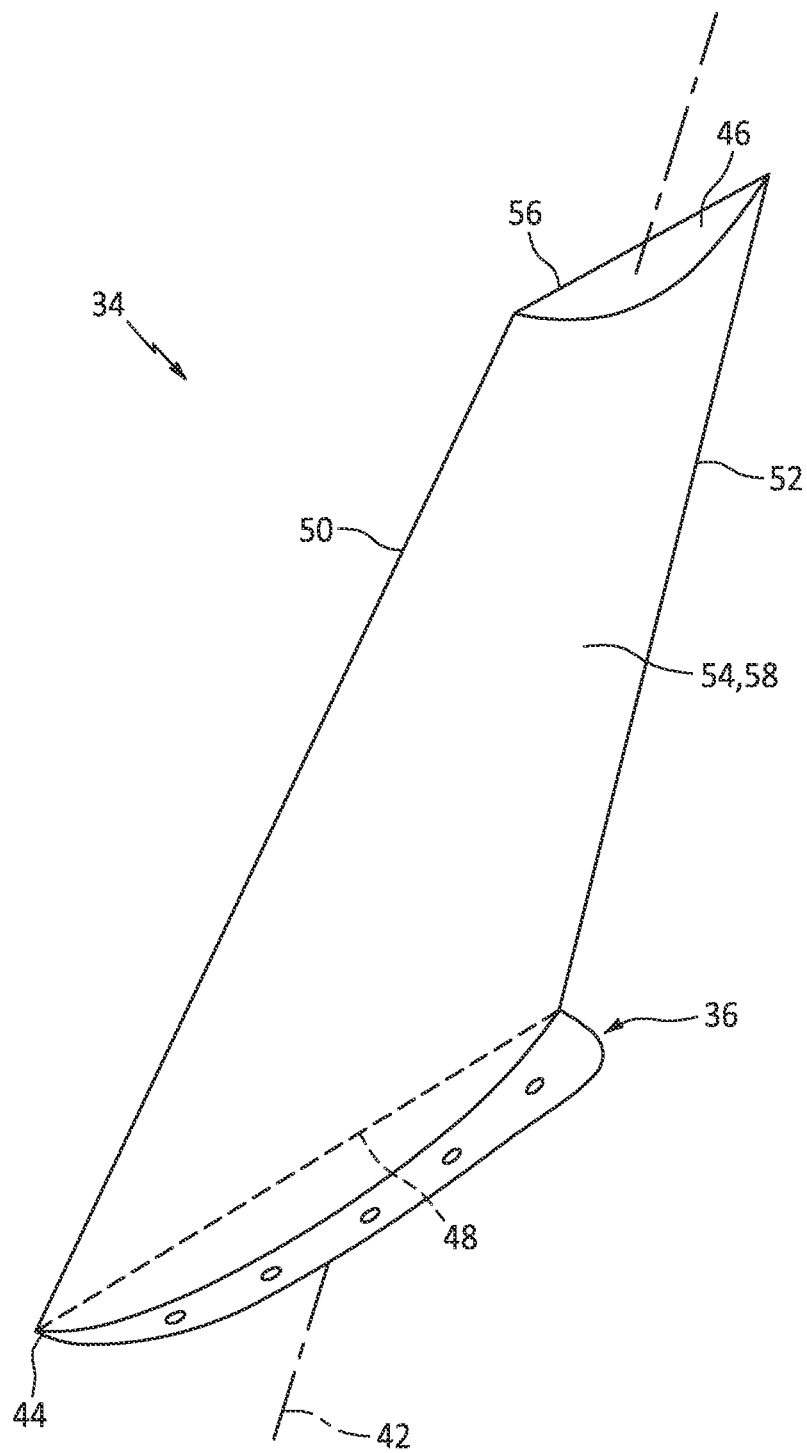
FIG. 5 is a perspective illustration of an airfoil segment of an airfoil body.

Referring to FIG. 5, each airfoil segment 34 extends spanwise along the centerline 42 from (or about) the airfoil base 44 to the airfoil tip 46. Each airfoil segment 34 extends lengthwise along the camber line 48 from the airfoil body leading edge 50 (or, alternatively the airfoil leading edge 40) to the airfoil trailing edge 52. Each airfoil segment 34 extends widthwise from an interior side 56 (e.g., an intersegment mating side) of the respective airfoil segment 34 to the airfoil body exterior surface 54 that is formed by that respective airfoil segment 34.

Figure 6:
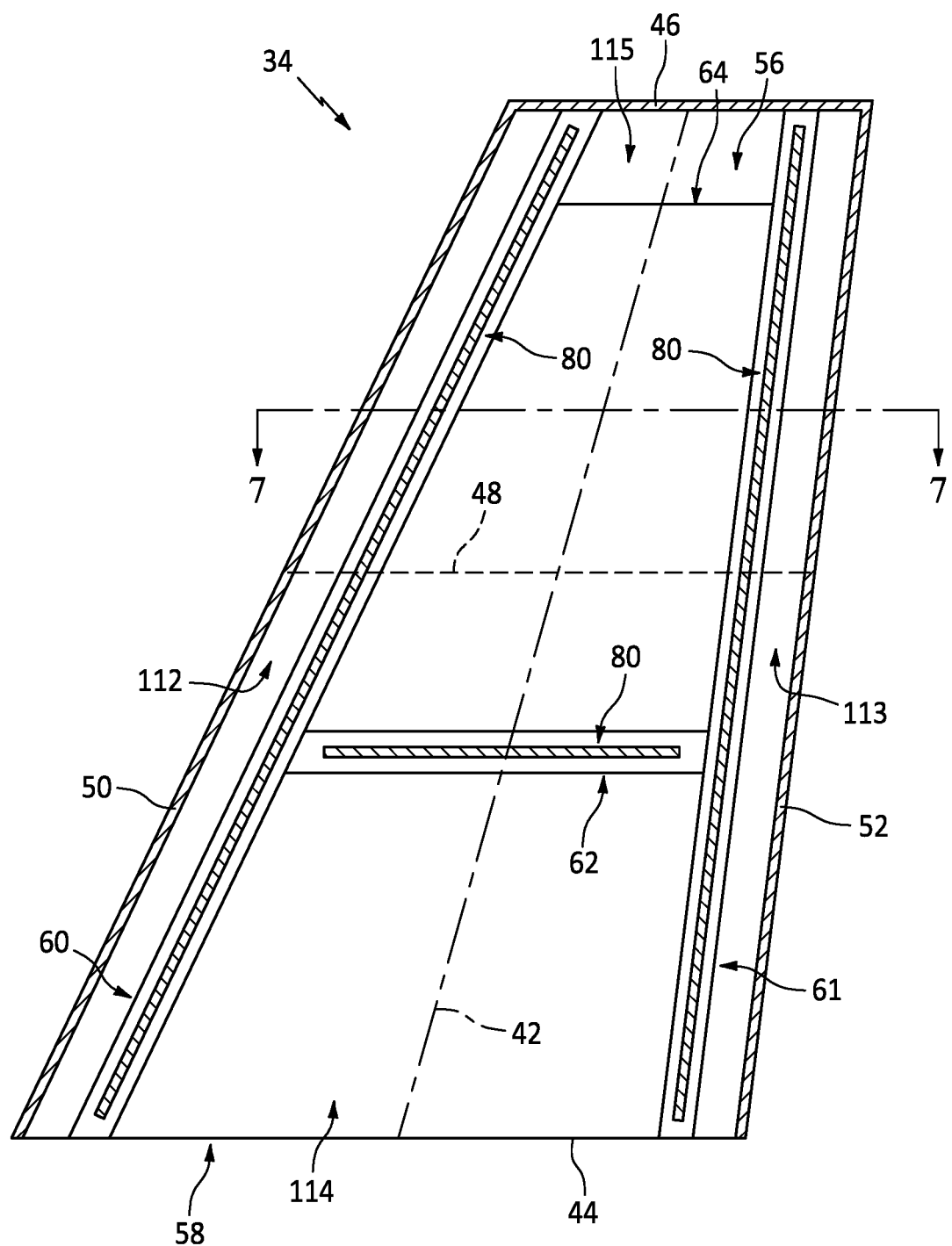
FIG. 6 is a side illustration of an interior of the airfoil segment with a plurality of segment mounts schematically depicted.
Figure 7:
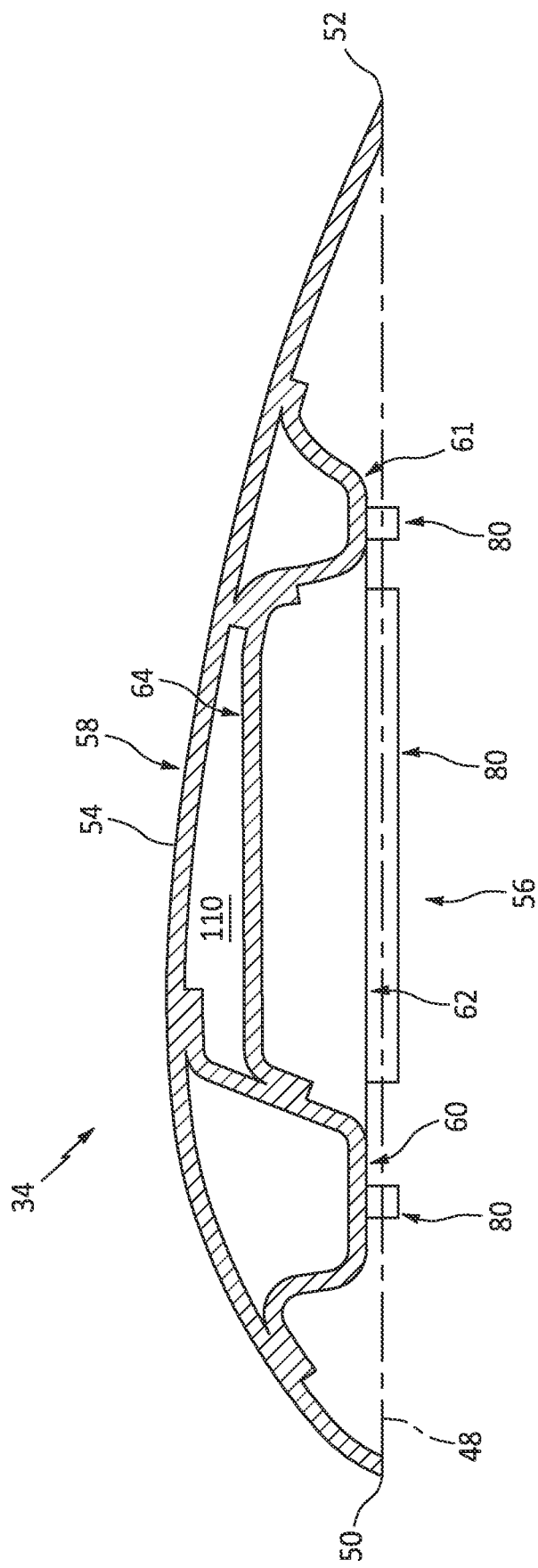
FIG. 7 is a cross-sectional illustration of the airfoil segment taken along section line 7-7 in FIG. 6 with its segment mounts schematically depicted.

Referring to FIGS. 6 and 7, each airfoil segment 34 includes an exterior skin 58 and one or more (e.g., discrete or interconnected) internal supports 60-62. One or each of the airfoil segments 34 may also include an electric device mount 64.

Referring to FIG. 5, the exterior skin 58 is configured to at least partially or completely form an exterior periphery of the respective airfoil segment 34. For example, the exterior skin 58 of FIG. 5 (e.g., completely) forms its respective airfoil body exterior surface 54. The exterior skin 58 of FIG. 5 also (e.g., partially) forms the airfoil body leading edge 50, the airfoil trailing edge 52 and/or the airfoil tip 46. More particularly, the exterior skin 58 of FIG. 5 extends spanwise from (or about) the airfoil base 44 to (or about) the airfoil tip 46, and lengthwise from (or about) the airfoil body leading edge 50 to (or about) the airfoil trailing edge 52. A leading edge end of the exterior skin 58 may thereby at least partially form the airfoil body leading edge 50. A trailing edge end of the exterior skin 58 may at least partially for the airfoil trailing edge 52. The exterior skin 58 of FIG. 5 also extends widthwise across the airfoil tip 46 to the airfoil segment interior side 56, and lengthwise across the airfoil tip 46 between and to the edges 50 and 52. The exterior skin 58 may thereby form a portion of the airfoil tip 46 that is carried by the respective airfoil segment 34.

Referring to FIGS. 6 and 7, each of the internal supports 60-62 may be configured as an internal stiffener (e.g., a structural rib or other member) for supporting and providing rigidity to the respective exterior skin 58. Each of the internal supports 60-62, for example, is arranged on the airfoil segment interior side 56 and is connected to (e.g., formed integral with) the respective exterior skin 58.

Referring to FIG. 6, the leading edge (LE) support 60 is arranged at (e.g., on, adjacent or proximate) the airfoil body leading edge 50. This LE support 60 extends spanwise between and to (or about) the airfoil base 44 and the airfoil tip 46. The trailing edge (TE) support 61 is arranged at (e.g., on, adjacent or proximate) the airfoil trailing edge 52. This TE support 61 extends spanwise between and to (or about) the airfoil base 44 and the airfoil tip 46. The intermediate support 62 is arranged intermediately (e.g., about midway) spanwise along the centerline 42 between the airfoil base 44 and the airfoil tip 46. This intermediate support 62 extends lengthwise between and to (or about) the LE support 60 and the TE support 61.

Figure 8:
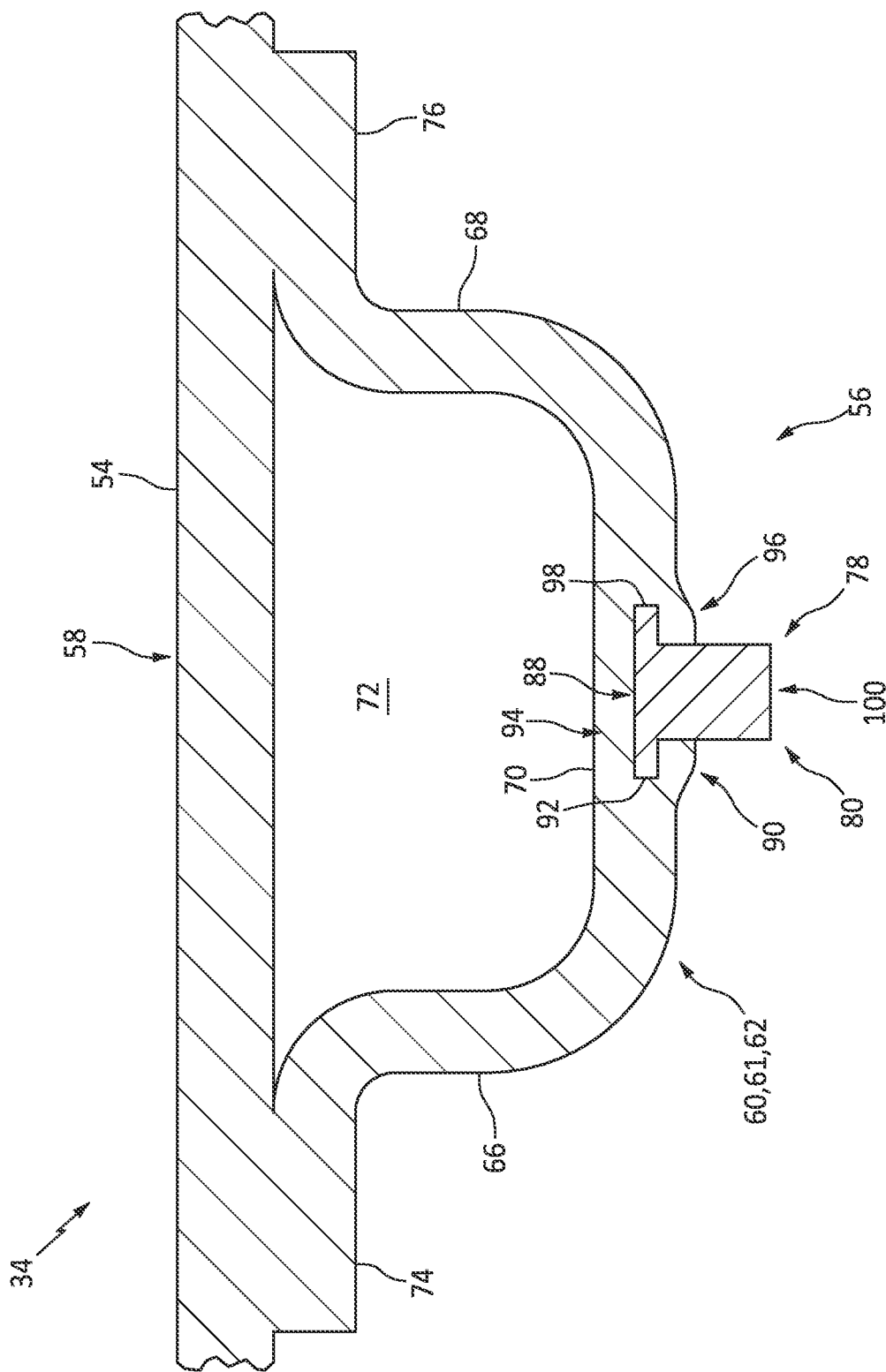
FIG. 8 is a cross-sectional illustration of an internal support connected to a portion of an exterior skin, where the segment mount for the internal support is schematically depicted.

Referring to FIG. 8, each of the internal supports 60-62 may have a channeled and/or tubular configuration; e.g., a hat or top-hat configuration. Each internal support 60, 61, 62, for example, may be configured as a flanged (e.g., outward lipped, or inward lipped) U-channel, C-channel or V-channel beam. More particularly, each internal support 60, 61, 62 may have a flanged U-shaped, C-shaped or V-shaped cross-sectional geometry when viewed, for example, in a plane perpendicular to a longitudinal centerline of the internal support; e.g., the plane of FIG. 8. The present disclosure, of course, is not limited to the foregoing exemplary internal support configurations.

Each internal support 60, 61, 62 may include one or more internal sidewalls 66 and 68 (e.g., structural flanges) and an internal endwall 70 (e.g., a structural web). These support elements 66, 68 and 70 are configured together to collectively provide the respective internal support 60, 61, 62 with an internal support channel 72. This channel 72 extends longitudinally along the longitudinal centerline of the respective internal support, where the channel 72 of FIG. 8 is closed off by an interior peripheral portion of the exterior skin 58 of the respective airfoil segment 34. Each internal support 60, 61, 62 may also include one or more outward lips 74 and 76 (or inward lips) for fixing the internal support 60, 61, 62 to the exterior skin 58.

The internal support members 66, 68, 70, 74 and 76 of FIG. 8 are integrally connected together, and each internal support 60, 61, 62 is integrally connected to the respective exterior skin 58 as described below in further detail. Each of the internal support members 66, 68, 70, 74 and 76 may extend longitudinally along a portion or an entire longitudinal length of the respective internal support 60, 61, 62.

The first sidewall 66 is connected to the respective exterior skin 58 at an interior of the respective airfoil segment 34 via, for example, the first lip 74. In particular, the first lip 74 is connected to and projects out (e.g., in a first direction away from the channel 72) from the first sidewall 66. The first lip 74 of FIG. 8 extends along and is connected to the respective exterior skin 58. The first sidewall 66 projects inward from the respective exterior skin 58 and the first lip 74 to a distal end 78 of the respective internal support 60, 61, 62.

The second sidewall 68 is connected to the respective exterior skin 58 at the interior of the respective airfoil segment 34 via, for example, the second lip 76. In particular, the second lip 76 is connected to and projects out (e.g., in a second direction away from the channel 72 that is opposite the first direction) from the second sidewall 68. The second lip 76 of FIG. 8 extends along and is connected to the respective exterior skin 58. The second sidewall 68 projects inward from the respective exterior skin 58 and the second lip 76 to the distal end 78 of the respective internal support 60, 61, 62.

The endwall 70 is arranged at (e.g., on, adjacent or proximate) the distal end 78 of the respective internal support 60, 61, 62. The endwall 70 of FIG. 8 is connected to and extends between the first sidewall 66 and the second sidewall 68. With this arrangement, the internal support channel 72 extends between and to the respective exterior skin 58 and the endwall 70. The internal support channel 72 also extends between and to the opposing sidewalls 66 and 68.

Figure 9:
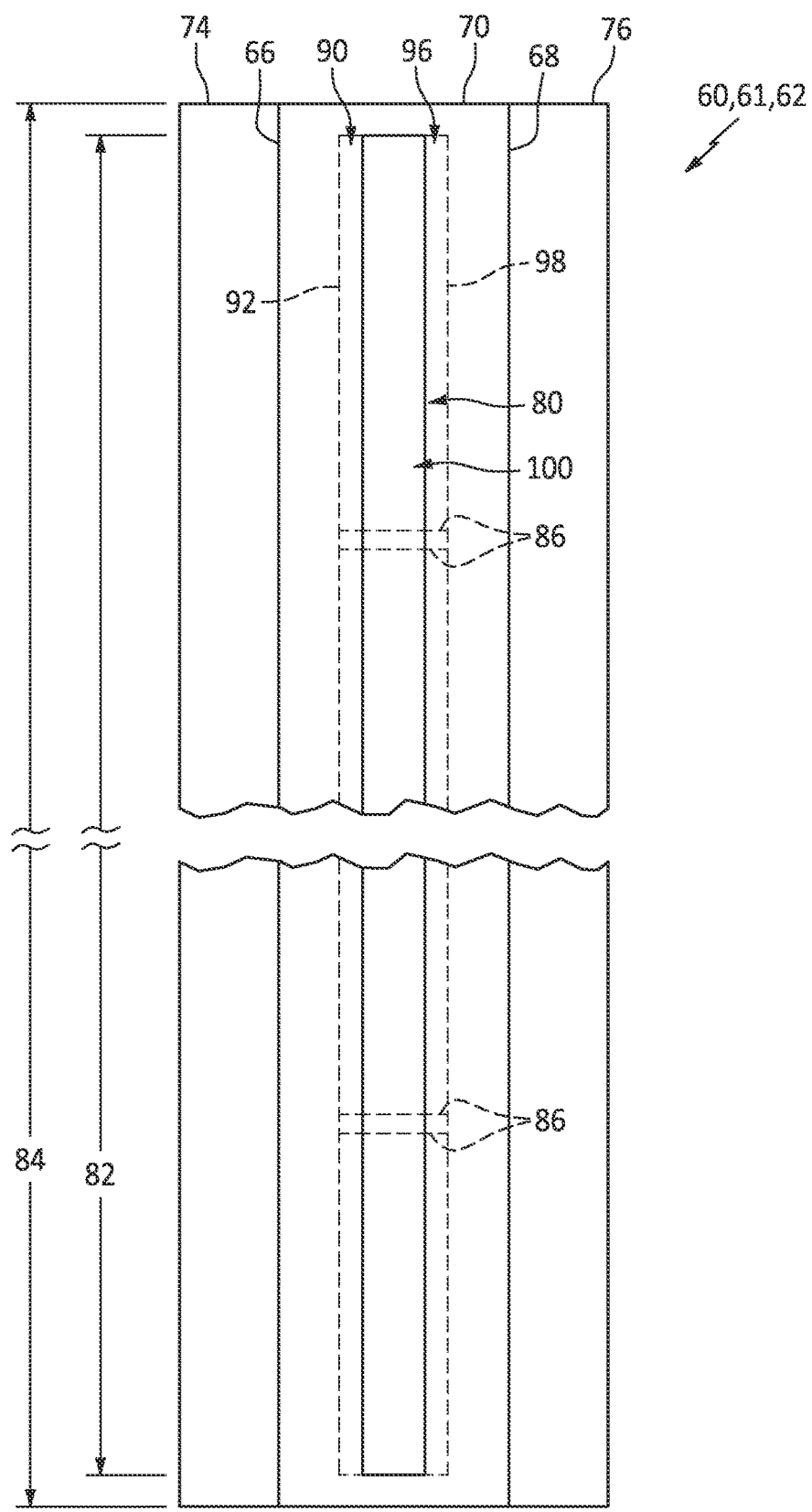
FIG. 9 is a partial illustration of the internal support with its segment mount schematically depicted.

Each internal support 60, 61, 62 may also include a segment-to-segment mount 80 (e.g., an inter-lockable coupler, an interface, etc.), which is shown schematically in FIGS. 6-9. Referring to FIG. 9, each segment mount 80 may extend longitudinally along the respective internal support 60, 61, 62. A longitudinal length 82 of the segment mount 80 may be equal to or less than a longitudinal length 84 of the respective internal support 60, 61, 62. For example, the segment mount length 82 may be greater than fifty percent (50%), sixty percent (60%), seventy percent (70%), eighty percent (80%) or ninety percent (90%) of the internal support length 84, but equal to or less than the internal support length 84. In some embodiments, the segment mount 80 may extend uninterrupted along its entire longitudinal length 82. In other embodiments, the segment mount 80 may be longitudinally interrupted; e.g., cut, formed by multiple spaced (or abutted) segments represented by dashed lines 86 in FIG. 9, etc.

Referring to FIG. 8, the segment mount 80 is connected to (e.g., formed integral with) the respective endwall 70. A base 88 of the segment mount 80, for example, may be embedded within (or otherwise configured with and/or coupled to) material of the respective endwall 70. A first portion 90 of the endwall material in FIG. 8, for example, overlaps a first side 92 of the segment mount base 88. The base first side 92 is thereby captured (e.g., sandwiched) between and secured (e.g., bonded) to the first portion 90 of the endwall material and a base portion 94 of the endwall material. In addition, a second portion 96 of the endwall material in FIG. 8 overlaps a second side 98 of the segment mount base 88. The base second side 98 is thereby captured (e.g., sandwiched) between and secured (e.g., bonded) to the second portion 96 of the endwall material and the base portion 94 of the endwall material.

Figure 10:
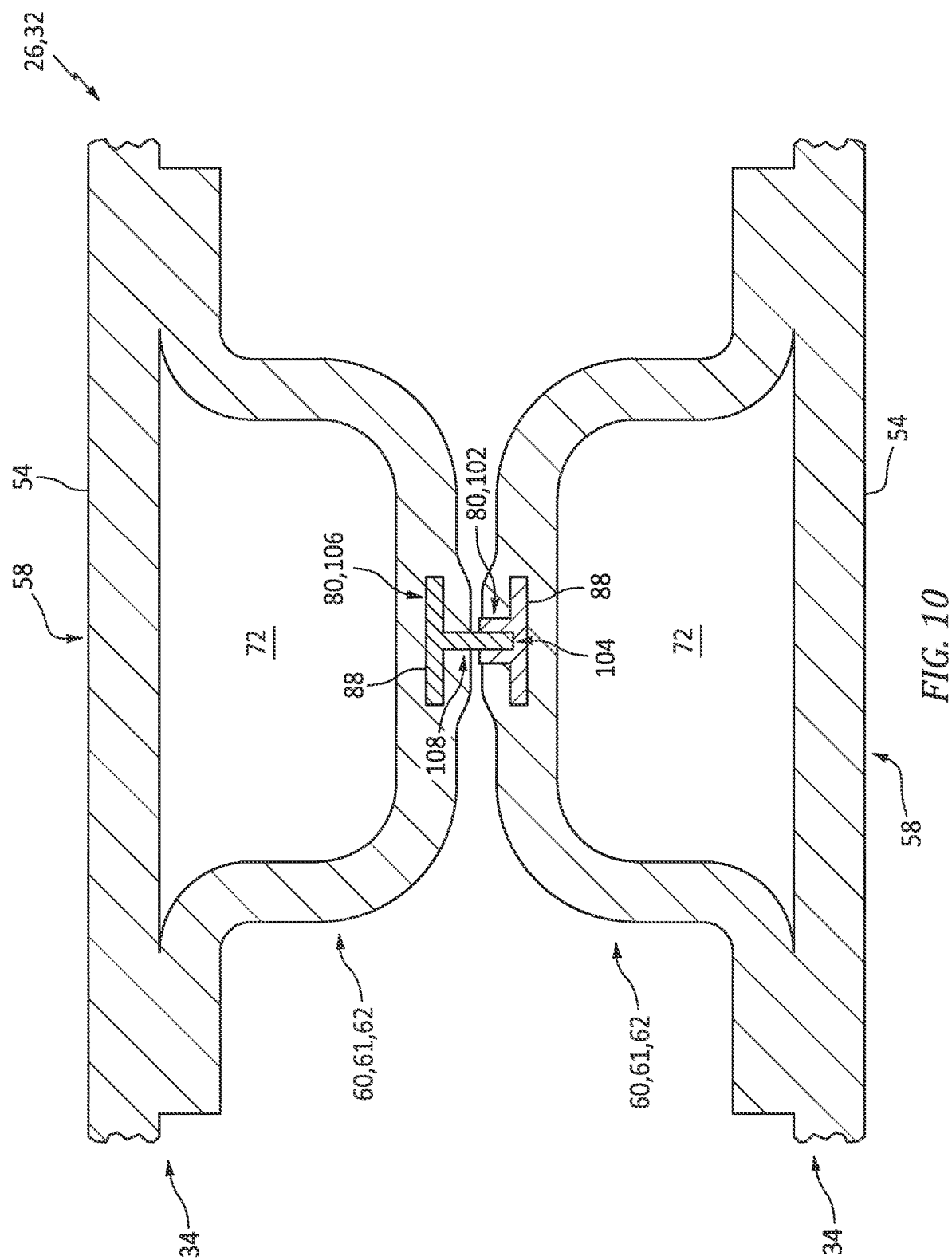
FIG. 10 is a cross-sectional illustration of a portion of the airfoil body depicting an interface connection between respective segment mounts.

An interface 100 of the segment mount 80 is connected to (e.g., formed integral with) and projects out from the segment mount base 88 to a distal end of the segment mount interface 100/the segment mount 80. This segment mount interface 100 is configured to mate with another one of the segment mount interfaces 100 configured with the corresponding internal support 60, 61, 62 of the other (e.g., opposing) airfoil segment 34. For example, referring to FIG. 10, one of the segment mounts 80 may be configured as a receptacle 102 with a receptacle aperture 104; e.g., a channel, a slot, a groove, etc. The other one of the segment mounts 80 may be configured as a key 106 with a key protrusion 108; e.g., a rib, a rail, a rim, etc. With such an arrangement, when the key 106 mates with the receptacle 102, the key protrusion 108 may project into the receptacle aperture 104 to provide an inter-locking (e.g., tongue-and-groove) interface between the respective segment mounts 80. The key 106 and its protrusion 108 may also be attached (e.g., bonded) to the receptacle 102 to fixedly secure the engaged (e.g., interlocked) segment mounts 80 together.

Referring again to FIGS. 6 and 7, the electric device mount 64 is arranged at the interior of the respective airfoil segment 34. The electric device mount 64 of FIGS. 6 and 7, for example, is arranged lengthwise between the LE support 60 and the TE support 61. This electric device mount 64 is also arranged spanwise between the intermediate support 62 and the airfoil tip 46. Referring to FIG. 7, the electric device mount 64 may be spaced from the respective exterior skin 58 by a (e.g., air) gap 110.

The electric device mount 64 may be connected to (e.g., formed integral with) one or more or each of the internal supports 60-62 of the respective airfoil segment 34. The electric device mount 64, for example, may extend lengthwise between and to the LE support 60 and the TE support 61. As best seen in FIG. 6, the electric device mount 64 may also or alternatively project out from the intermediate support 62 towards the airfoil tip 46.

The electric device mount 64 may be configured as an internal mounting tray. The electric device mount 64 of FIGS. 6 and 7, for example, has a generally plate-like configuration.

Figure 11:
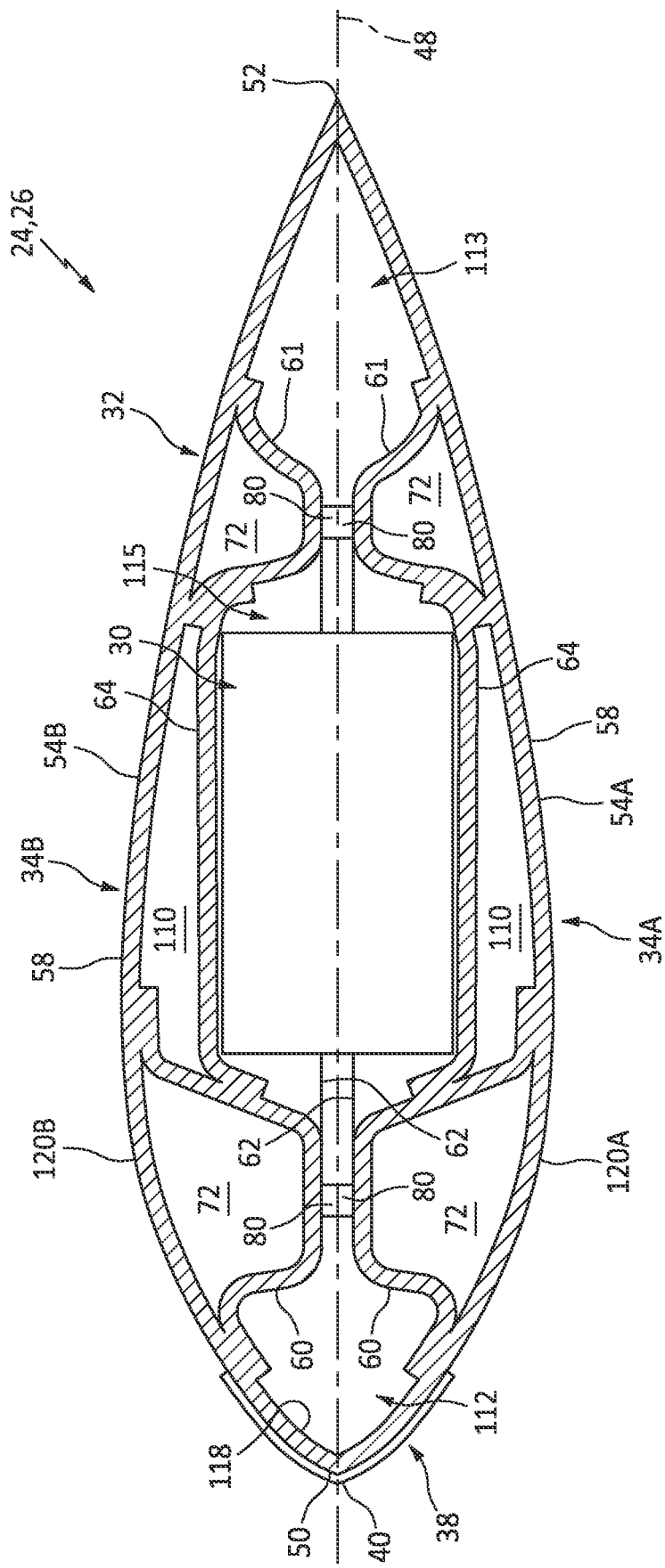
FIG. 11 is a cross-sectional illustration of the airfoil system with its segment mounts and an electric device schematically depicted.
Figure 12:
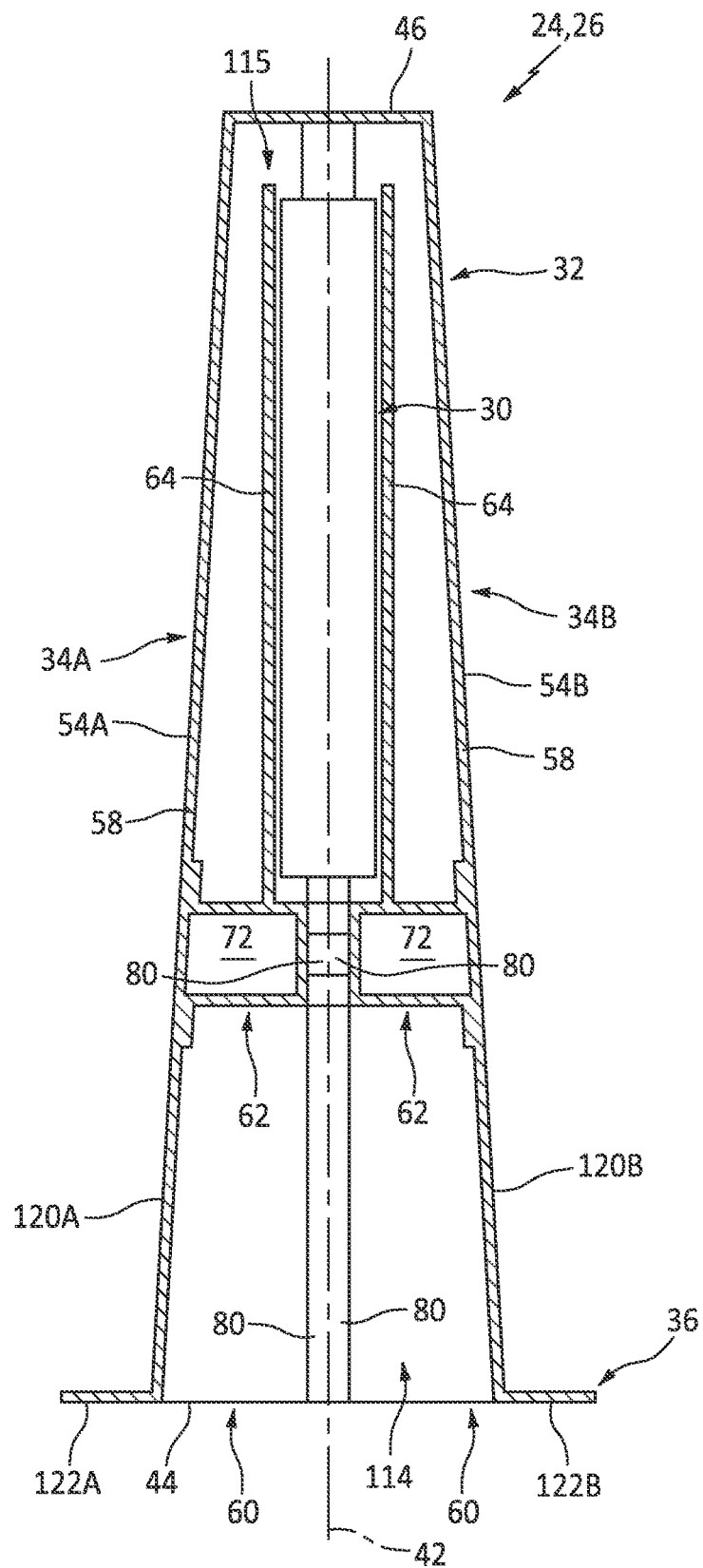
FIG. 12 is a sectional illustration of the airfoil system with its segment mounts and is electrical device schematically depicted.

Referring to FIGS. 11 and 12, the airfoil body 32 is formed by attaching the airfoil segments 34 together. The edges of the exterior skins 58 are aligned, for example, and may be attached (e.g., bonded) together using bonding material such as resin or any other adhesive, and/or joined via a sealant material. Internal support structures (e.g., networks of the internal supports 60-62) of the airfoil segments 34 are also aligned and may be attached (e.g., bonded) together using bonding material such as resin or any other adhesive. For example, the LE support 60 of one of the airfoil segments 34A is aligned with the LE support 60 of the other one of the airfoil segments 34B. The segment mounts 80 of those LE supports 60 are mated and/or secured together as described above; e.g., see FIG. 10. The TE support 61 of one of the airfoil segments 34A is aligned with the TE support 61 of the other one of the airfoil segments 34B. The segment mounts 80 of those TE supports 61 are mated and/or secured together as described above; e.g., see FIG. 10. The intermediate support 62 of one of the airfoil segments 34A is aligned with the intermediate support 62 of the other one of the airfoil segments 34B. The segment mounts 80 of those intermediate supports 62 are mated and/or secured together as described above; e.g., see FIG. 10. With such an arrangement, the airfoil segments 34 may be connected together without, for example, use of any traditional (e.g., metal and/or otherwise) fasteners; e.g., bolts, screws, rivets, etc. The airfoil body 32 may therefore be a fastener-free body.

The airfoil body 32 is configured with one or more internal cavities 112-115. Referring to FIG. 11, the leading edge (LE) cavity 112 is arranged at the airfoil body leading edge 50. This LE cavity 112 is formed collectively by the joined exterior skins 58 and the joined LE supports 60. The LE cavity 112, for example, extends lengthwise within the airfoil body 32 from the joined exterior skins 58 to the joined LE supports 60. The LE cavity 112 extends widthwise within the airfoil body 32 between the opposing exterior skins 58. The LE cavity 112 extends spanwise within the airfoil body 32, and along the airfoil body leading edge 50, from (or about) the airfoil base 44 to the joined exterior skins 58 at the airfoil tip 46; see also FIG. 6.

The trailing edge (TE) cavity 113 is arranged at the airfoil trailing edge 52. This TE cavity 113 is formed collectively by the joined exterior skins 58 and the joined TE supports 61. The TE cavity 113, for example, extends lengthwise within the airfoil body 32 from the joined exterior skins 58 to the joined TE supports 61. The TE cavity 113 extends widthwise within the airfoil body 32 between the opposing exterior skins 58. The TE cavity 113 extends spanwise within the airfoil body 32, and along the airfoil trailing edge 52, from (or about) the airfoil base 44 to the joined exterior skins 58 at the airfoil tip 46; see also FIG. 6.

Referring to FIGS. 6 and 12, the inner cavity 114 is arranged at the airfoil base 44. This inner cavity 114 is formed collectively by the joined exterior skins 58, the joined LE supports 60, the joined TE supports 61 and the joined intermediate supports 62. The inner cavity 114, for example, extends lengthwise within the airfoil body 32 from the joined LE supports 60 to the joined TE supports 61. The inner cavity 114 extends widthwise within the airfoil body 32 between the opposing exterior skins 58. The inner cavity 114 extends spanwise within the airfoil body 32 from (or about) the airfoil base 44 to the joined intermediate supports 62.

Referring to FIGS. 11 and 12, the outer (e.g., electric device) cavity 115 is arranged at the airfoil tip 46. This outer cavity 115 is formed collectively by the joined exterior skins 58, the joined LE supports 60, the joined TE supports 61, the joined intermediate supports 62 and the electric device mounts 64. The outer cavity 115, for example, extends lengthwise within the airfoil body 32 from the joined LE supports 60 (e.g., a leading edge (LE) end of the outer cavity 115) to the joined TE supports 61 (e.g., a trailing edge (TE) end of the outer cavity 115). The outer cavity 115 extends widthwise within the airfoil body 32 between the opposing exterior skins 58 and/or the opposing electric device mounts 64; e.g., between opposing sides of the outer cavity 115. The outer cavity 115 extends spanwise within the airfoil body 32 from the joined intermediate supports 62 (e.g., a lower, base end of the outer cavity 115) to the joined exterior skins 58 at the airfoil tip 46 (e.g., an upper, tip end of the outer cavity 115).

The outer cavity 115 of FIGS. 11 and 12 is configured (e.g., shaped and sized) to at least partially or completely receive the electric device 30 therewith. The electric device 30 may thereby be arranged within the outer cavity 115 (prior to assembly and attachment of the airfoil segments 34). The electric device 30 may be secured within the airfoil body 32 by attaching the electric device 30 to one or each of the airfoil segments 34. The electric device 30 of FIGS. 11 and 12, for example, may be attached (e.g., bonded) to one or each of the opposing electric device mounts 64 using bonding material such as resin or any other adhesive.

The shield 38 of FIG. 11 is configured to protect the airfoil body leading edge 50 from foreign object damage (FOD), erosion and/or other damage. The shield 38, for example, may be formed from a durable material such as metal; e.g., nickel (Ni). The shield 38 is attached to the airfoil body 32. A leading edge portion of the airfoil body 32, for example, is inserted into an internal channel of the shield 38 such that an interior surface 118 of the shield 38 is engaged with (e.g., abutted against) an exterior (e.g., the surfaces 54) of the airfoil body 32 at its leading edge 50. The shield 38 may be attached (e.g., bonded) to the airfoil body 32 and its exterior skins 58 using bonding material such as resin or any other adhesive.

Referring to FIG. 1, the shield 38 may extend along a majority (e.g., at least 80-90%) or an entirety of the airfoil body leading edge 50. The shield 38 of FIG. 1 may thereby at least partially or completely form the airfoil leading edge 40. The shield 38 also forms leading edge portions of opposing exterior surfaces 120A and 120B (generally referred to as "120") (e.g., exposed side surfaces) of the airfoil 26. The remaining portions (and substantially a majority) of the opposing airfoil exterior surfaces 120 are formed by exposed portions of the exterior skins 58 and their exterior surfaces 54. The exterior skins 58 of the airfoil body 32 are thereby arranged at and may at least partially form (or completely form where the shield 38 is omitted) the opposing airfoil exterior surfaces 120.

Referring still to FIG. 1, the airfoil mount 36 is arranged at the airfoil base 44. The airfoil mount 36 is connected to (e.g., formed integral with) the airfoil body 32. The airfoil mount 36 of FIG. 1, for example, includes one or more flanges 122A and 122B (generally referred to as "122"); see also FIG. 12. Each of these flanges 122 is connected to and projects outward from a respective one of the exterior skins 58. The airfoil mount 36 and its flanges 122 are connected (e.g., mechanically fastened, bonded and/or otherwise attached) to the aircraft assembly base 22 to fixedly secure the airfoil system 24 and its airfoil 26 to the aircraft assembly base 22. The airfoil mount 36, for example, may be mechanically fastened to the aircraft assembly base 22 using one or more fasteners 124, and/or bonded using bonding material such as resin or any other adhesive.

The airfoil body 32 and its airfoil segments 34 may be constructed substantially (or only) from the non-metallic and/or dielectric material(s). In particular, the airfoil body 32 and its airfoil segments 34 may be constructed substantially (or only) from composite material such as, but not limited to, non-metallic fiber reinforcement within a matrix. An example of the non-metallic fiber reinforcement is, but is not limited to, fiberglass. An example of the matrix is, but is not limited to, polymer (e.g., thermoplastic or thermoset) resin.

Referring to FIGS. 11 and 12, each airfoil segment 34 and its various components 58, 60-62 and 64 may be formed together as a single, monolithic body. Herein, the term "monolithic" may described a single, unitary body formed (e.g., resin pressure molded (RPM), resin transfer molded (RTM) or otherwise constructed) as a single collective mass of material. For example, while the segment mounts 80 may be constructed from material that is different than the material (e.g., the non-metallic and/or dielectric material(s)) of the remainder their respective airfoil segment 34, each segment mount 80 may be laid up integrally with and incorporated with the other material during the formation process. The term "monolithic" may also describe herein a single, unitary body formed from discrete elements that are permanently attached together via, for example, fusion, welding and/or an adhesive (e.g., epoxy resin). A non-monolithic body, by contrast, includes discretely formed bodies which are removably attached together; e.g., mechanically fastened together, brazed together, etc.

Figure 13:
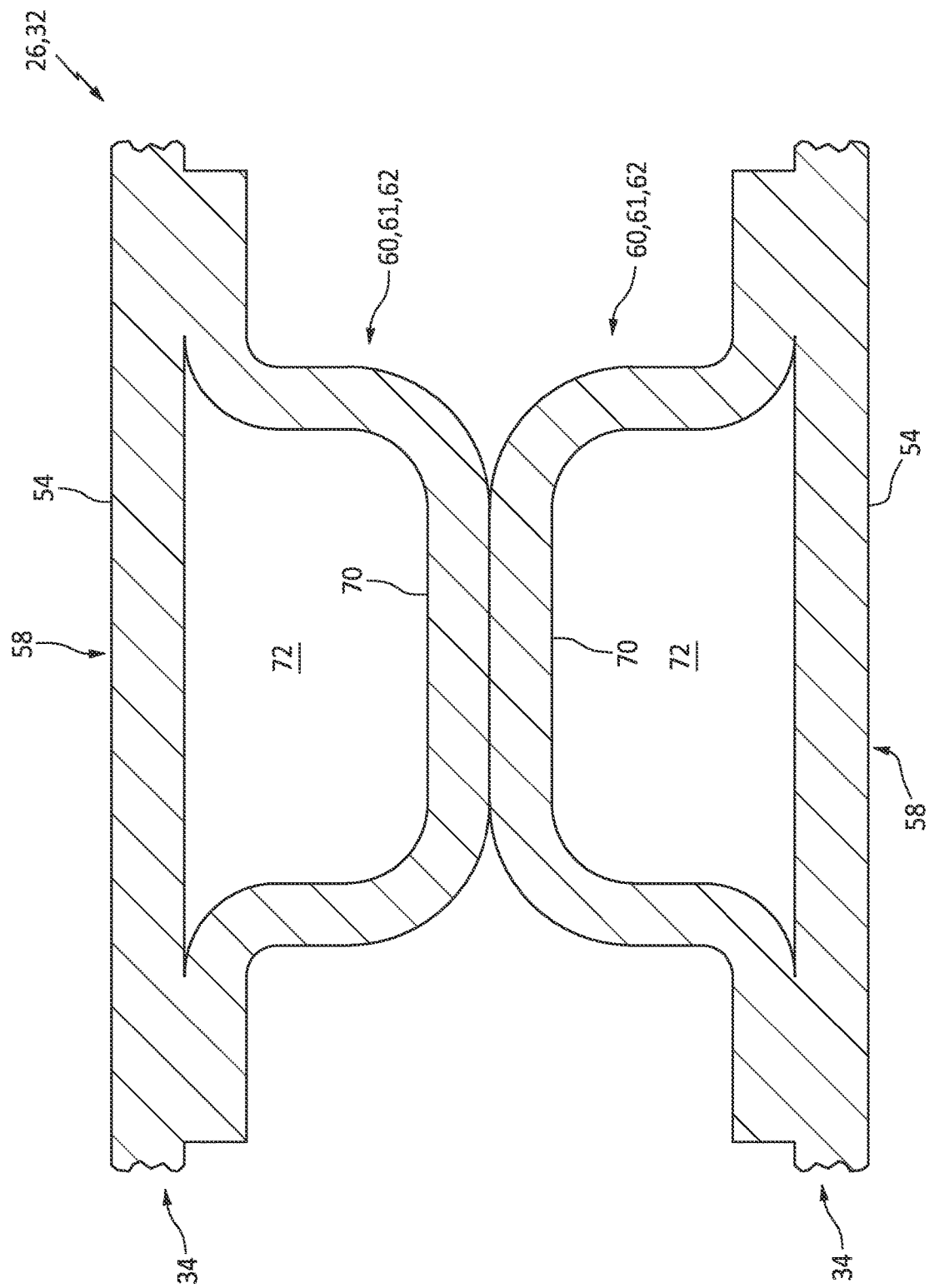
FIG. 13 is a cross-sectional illustration of a portion of the airfoil body depicting another interface connection between respective segment mounts.

As described above, the segment mounts 80 may be constructed from material that is different than the remainder their respective airfoil segment 34. Each segment mount 80, for example, may be constructed from metal such as, but not limited to, aluminum (Al). Thus, while the non-metallic and/or dielectric material(s) is selected to reduce signal interference for the electric device 30 and/or airfoil reduce weight, the segment mount material may be selected to provide a more robust, rigid, precise connection between the airfoil segments 34. Of course, in other embodiments, one or more of the segment mounts 80 may be constructed from composite material (e.g., non-metallic material), which composite material may be the same or different than the material forming the remainder of the respective airfoil segment 34. In still other embodiments, one or more respective pairs of the segment mounts 80 may be omitted as shown, for example, in FIG. 13. One or more of respective sets of endwalls 70, for example, may be joined directly together via, for example, an adhesive butt connection.

Each airfoil segment 34 may be formed using resin pressure molding (RPM), resin transfer molding (RTM) and/or various other molding process. For example, one or more plies of reinforcement material (e.g., fiberglass) may be arranged within a mold. By using one or more mandrels, the reinforcement material may be arranged to form a preform (e.g., a body having a general shape) of the respective airfoil segment 34 and each of its members 58, 60-62 and 64. In addition, the respective segment mounts 80 may also be laid up with the reinforcement material (e.g., between the plies) such that those mounts 80 are formed integral with the airfoil segment 34; e.g., see FIGS. 8 and 10. The mold may then be closed, and resin may be injected into the closed mold under pressure to infiltrate the reinforcement material and form a matrix in which the reinforcements material is embedded. The resin may then be cured under elevated pressure and/or an elevated temperature. Following this curing, the mandrels are removed from the airfoil segment 34 and the airfoil segment 34 is removed from the mold. Each airfoil segment 34 may thereby be integrally formed using a single molding process. This may reduce complexity and/or costs of airfoil manufacture. The present disclosure, however, is not limited to the foregoing exemplary manufacturing techniques.

Figure 14:
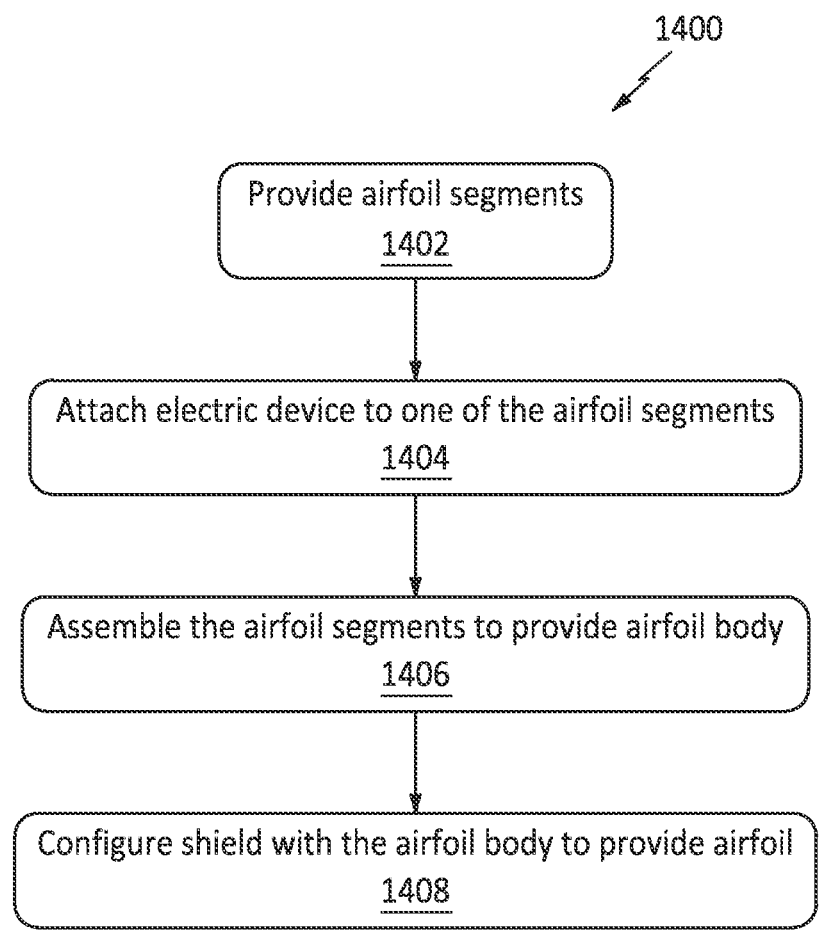
FIG. 14 is a flow diagram of a method for manufacturing the airfoil system.

FIG. 14 is a flow diagram of a method 1400 for manufacturing an airfoil system such as the airfoil system 24 described above. In step 1402, each of the airfoil segments 34 is provided. Each airfoil segment 34, for example, may be formed as described above using resin pressure molding (RPM), resin transfer molding (RTM) and/or various other molding process.

In step 1404, the electric device 30 is attached to a first of the airfoil segment (e.g., 34A). The electric device 30, for example, may be attached (e.g., bonded) to the electric device mount 64 of the first airfoil segment (e.g., 34A).

In step 1406, the airfoil body 32 is assembled. Bonding material, for example, may be applied to one or more mating portions of one or both of the airfoil segments 34. The airfoil segments 34 may then be aligned and mated as described above such that the bonding material attaches the airfoil segments 34 together. Additional bonding material may also be applied to further secure the electric device 30 to the second airfoil segment (e.g., 34B) and its electric device mount 64.

In step 1408, the shield 38 is configured with the airfoil body 32 to provide the airfoil 26. The airfoil body 32, for example, may be mated with and attached to the shield 38 as described above.

In some embodiments, the method 1400 may be modified to include one or more additional steps and/or to omit one or more of the foregoing steps. For example, the method 1400 may include one or more formation (e.g., machining, cutting, etc.) processes and/or one or more finishing (e.g., sanding, treating, coating, etc.) processes. The method 1400 may also or alternatively omit the step 1404 and/or the step 1408 where, for example, the airfoil 26 is configured without the electric device 30 and/or the shield 38.

The airfoil body 32 and its airfoil segments 34 may be constructed substantially (or only) from the non-metallic and/or dielectric material(s) as described above. However, in other embodiments, the internal support structure/airfoil frame (e.g., the internal supports 60, 61 and/or 62) may be constructed from metal, or another material that is different than the exterior skin 58 material. For example, the exterior skins 58 may be constructed from the non-metallic and/or dielectric material, whereas one or more of the internal supports 60, 61 and/or 62 may be constructed from the other material; e.g., metal. The internal supports 60, 61 and/or 62, for example, may be formed discretely and then formed integral with the exterior skins 58 in, for example, a similar manner as described above with respect to the segment mounts 80. In such embodiments, each segment mount 80 may be formed with a respective one of the internal supports 60, 61, 62 as a monolithic (e.g., metal) body or bonded to that internal support after formation. In other embodiments, the (e.g., metal) internal supports 60, 61 and/or 62 may be bonded to the exterior skins 58 following formation thereof. The present disclosure therefore is not limited to any particular materials or construction techniques.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An airfoil system, comprising:
an airfoil comprising a first exterior surface, a second exterior surface, a first airfoil segment and a second airfoil segment attached to the first airfoil segment, the airfoil extending widthwise between the first exterior surface and the second exterior surface, the first airfoil segment forming the first exterior surface, and the second airfoil segment forming the second exterior surface; and
an electric device embedded within the airfoil between the first airfoil segment and the second airfoil segment, the electric device abutted widthwise against and attached to the first airfoil segment;

wherein the first airfoil segment includes
  a first segment skin forming the first exterior surface;
  a first segment leading edge support connected to the first segment skin with a first segment leading edge support channel extending widthwise between and formed by the first segment leading edge support and the first segment skin, wherein the first segment leading edge support is widthwise connected to the second airfoil segment;
  a first segment trailing edge support connected to the first segment skin with a first segment trailing edge support channel extending widthwise between and formed by the first segment trailing edge support and the first segment skin, wherein the first segment trailing edge support is widthwise connected to the second airfoil segment; and
  a first segment device mount extending lengthwise between and connected to the first segment leading edge support and the first segment trailing edge support with a gap widthwise between and formed by a first side of the first segment device mount and the first segment skin, wherein the electric device is abutted widthwise against and attached to a second side of the first segment device mount.

2. The airfoil system of claim 1, wherein the electric device comprises an antenna.

3. The airfoil system of claim 1, wherein the electric device comprises a sensor.

4. The airfoil system of claim 1, wherein
the airfoil further comprises an internal cavity formed collectively by the first airfoil segment and the second airfoil segment; and
the electric device is located within the internal cavity.

5. The airfoil system of claim 4, wherein
the internal cavity extends widthwise within the airfoil between a first cavity side and a second cavity side;
the first airfoil segment forms the first cavity side; and
the second airfoil segment forms the second cavity side.

6. The airfoil system of claim 4, wherein
the internal cavity extends lengthwise within the airfoil between a cavity leading end and a cavity trailing end;
the first airfoil segment forms a first portion of the cavity leading end and a first portion of the cavity trailing end; and
the second airfoil segment forms a second portion of the cavity leading end and a second portion of the cavity trailing end.

7. The airfoil system of claim 4, wherein
the internal cavity extends spanwise within the airfoil between a cavity base end and a cavity tip end;
the first airfoil segment forms a first portion of the cavity base end and a first portion of the cavity tip end; and
the second airfoil segment forms a second portion of the cavity base end and a second portion of the cavity tip end.

8. The airfoil system of claim 1, wherein the electric device is further abutted widthwise against and attached to the second airfoil segment.

9. The airfoil system of claim 1, wherein
the second airfoil segment comprises a second segment skin that forms the second exterior surface; and
the first segment skin and the second segment skin each comprises composite material.

10. The airfoil system of claim 1, wherein
the second airfoil segment comprises a second segment skin and a second internal support formed integral with the second segment skin, and the second segment skin forms the second exterior surface; and
the second internal support attached to one of the first segment leading edge support or the first segment trailing edge support.

11. The airfoil system of claim 10, wherein the second internal support is abutted against and bonded to the one of the first segment leading edge support or the first segment trailing edge support.

12. The airfoil system of claim 10, wherein
the one of the first segment leading edge support or the first segment trailing edge support comprises a receptacle; and
the second internal support comprises a key that is mated with the receptacle.

13. The airfoil system of claim 1, wherein
the airfoil comprises an airfoil body;
the first airfoil segment is a first half of the airfoil body; and
the second airfoil segment is a second half of the airfoil body.

14. The airfoil system of claim 1, wherein
the airfoil further comprises a shield;
the shield is configured at and extends spanwise along a leading edge of the airfoil; and
the shield overlaps and is attached to a first leading edge portion of the first airfoil segment and a second leading edge portion of the second airfoil segment.

15. A manufacturing method, comprising:
forming a first airfoil segment as a first monolithic body;
forming a second airfoil segment as a second monolithic body;
attaching an electric device to the first airfoil segment after the forming of the first airfoil segment; and
attaching the second airfoil segment to the first airfoil segment to provide an airfoil body, wherein the electric device is embedded within the airfoil body between the first airfoil segment and the second airfoil segment, and wherein the second airfoil segment is attached to the first airfoil segment after the forming the first airfoil segment, after the forming of the second airfoil segment and after the attaching of the electric device to the first airfoil segment;
wherein the first airfoil segment includes
  a first segment skin forming the first exterior surface;
  a first segment leading edge support connected to the first segment skin with a first segment leading edge support channel extending widthwise between and formed by the first segment leading edge support and the first segment skin, wherein the first segment leading edge support is widthwise connected to the second airfoil segment;
  a first segment trailing edge support connected to the first segment skin with a first segment trailing edge support channel extending widthwise between and formed by the first segment trailing edge support and the first segment skin, wherein the first segment trailing edge support is widthwise connected to the second airfoil segment; and
  a first segment device mount extending lengthwise between and connected to the first segment leading edge support and the first segment trailing edge support with a gap widthwise between and formed by a first side of the first segment device mount and the first segment skin, wherein the electric device is abutted widthwise against and attached to a second side of the first segment device mount.

16. The manufacturing method of claim 15, wherein the first airfoil segment and the second airfoil segment each comprise non-metallic material.

17. The manufacturing method of claim 15, further comprising:
   attaching a shield to the airfoil body to form a leading edge of an airfoil;
   wherein the airfoil includes the airfoil body and the shield.

\* \* \* \* \*